US009658919B2

United States Patent
Pathirane et al.

(10) Patent No.: US 9,658,919 B2
(45) Date of Patent: May 23, 2017

(54) MALFUNCTION ESCALATION

(71) Applicant: ARM LIMITED, Cambridge (GB)

(72) Inventors: Chiloda Ashan Senerath Pathirane, Cambridge (GB); Allan John Skillman, Cambridge (GB)

(73) Assignee: ARM Limited, Cambridge (GB)

( * ) Notice: Subject to any disclaimer, the term of this patent is extended or adjusted under 35 U.S.C. 154(b) by 99 days.

(21) Appl. No.: 14/685,779

(22) Filed: Apr. 14, 2015

(65) Prior Publication Data
US 2015/0355962 A1     Dec. 10, 2015

(30) Foreign Application Priority Data

Jun. 10, 2014   (GB) .................................. 1410295.8

(51) Int. Cl.
| G06F 11/00 | (2006.01) |
| G06F 11/07 | (2006.01) |
| G06F 11/10 | (2006.01) |
| G06F 11/08 | (2006.01) |

(52) U.S. Cl.
CPC ........ *G06F 11/0793* (2013.01); *G06F 11/079* (2013.01); *G06F 11/0751* (2013.01); *G06F 11/0772* (2013.01); *G06F 11/0784* (2013.01); *G06F 11/08* (2013.01); *G06F 11/1016* (2013.01); *G06F 11/1044* (2013.01)

(58) Field of Classification Search
CPC .. G06F 11/0772; G06F 11/00; G06F 11/1044; G06F 11/1016; G06F 11/2215; G06F 11/08
See application file for complete search history.

(56) References Cited

U.S. PATENT DOCUMENTS

| 2006/0179358 A1* | 8/2006 | Cordero .............. G06F 11/1441 |
| | | 714/5.11 |
| 2009/0006890 A1* | 1/2009 | Takada ................ G06F 11/0727 |
| | | 714/5.11 |
| 2010/0100763 A1 | 4/2010 | Chen |
| 2010/0293436 A1* | 11/2010 | Coteus ................ G06F 11/1048 |
| | | 714/763 |
| 2011/0047408 A1 | 2/2011 | Gille et al. |
| 2013/0139033 A1 | 5/2013 | Yu et al. |
| 2014/0040680 A1* | 2/2014 | Takaku ................. G06F 11/106 |
| | | 714/54 |

OTHER PUBLICATIONS

Search Report for GB1410295.8 dated Dec. 22, 2014, three pages.

* cited by examiner

Primary Examiner — Charles Ehne
(74) Attorney, Agent, or Firm — Nixon & Vanderhye P.C.

(57) ABSTRACT

A data processing apparatus includes error detection and correction circuitry with an associated hard-error memory buffer. When a correctable hard-error is detected associated with a memory access to a memory, if the hard-error memory buffer is already full, then this correctable hard-error is escalated to be handled as an uncorrectable hard-error. The escalated uncorrectable hard-error is then handled by uncorrectable error handling circuitry (fatal error circuitry) which may trigger an abort of corresponding processing operations by a processor core and force the relinquishing of resources within other circuit elements such as a store buffer.

14 Claims, 2 Drawing Sheets

MALFUNCTION ESCALATION

This application claims priority to GB Patent Application No. 1410295.8 filed 10 Jun. 2014, the entire content of which is hereby incorporated by reference.

BACKGROUND

This invention relates to the field of data processing systems. More particularly, this invention relates to mechanisms for handling malfunctions within processing systems.

It is known to provide data processing systems with mechanisms for handling malfunctions in the operation of the data processing system. An example of such systems are those which employ error correction codes (ECC) to identify and correct malfunctions resulting in errors within data values stored within a memory. It is known that as memories become more dense, they become more vulnerable to both soft and hard errors. Soft errors may be the result of particle strikes or other temporary perturbations of the data values stored within the memory. Using error correcting codes, the perturbed data values may be detected as containing an error and then the error correcting codes used to correct that error. In the case of hard errors, these may arise due to the failure, during use or manufacture, of a circuit element producing an error in a data storage value stored within a memory which cannot be corrected using the error correction code, in the sense that the one or more bit values stored within the memory can be identified as being in error and the correct value identified, but the memory itself cannot be made to properly store the corrected data value. In this circumstance, it is known to provide mechanisms which are able to correct for such hard errors by substituting alternative storage hardware for the memory address locations in which the hard error has been detected. The corrected data value may then be stored within the alternative storage location instead of the storage location corresponding to the memory address in which the hard error has arisen.

SUMMARY

Viewed from one aspect the present technique provides an apparatus for processing data comprising:

processing circuitry configured to perform processing operations;

malfunction correction circuitry configured to detect and to correct correctable malfunctions in said processing operations;

detection circuitry coupled to said malfunction correction circuitry and configured to detect when one or more state variables of said malfunction correction circuitry indicate that said malfunction correction circuitry is unable to handle a correctable malfunction arising in said processing operations; and malfunction escalation circuitry coupled to said detection circuitry and configured to trigger handling of said correctable malfunction as an uncorrectable malfunction when said malfunction correction circuitry is detected as unable to correct said correctable malfunction.

Viewed from another aspect the present technique provides an apparatus for processing data comprising:

processing means for performing processing operations;

malfunction correction means for detecting and for correcting correctable malfunctions in said processing operations;

detection means, coupled to said malfunction correction means, for detecting when one or more state variables of said malfunction correction means indicate that said malfunction correction means is unable to handle a correctable malfunction arising in said processing operations; and malfunction escalation means, coupled to said detection means, for triggering handling of said correctable malfunction as an uncorrectable malfunction when said malfunction correction means is detected as unable to correct said correctable malfunction.

Viewed from a further aspect the present technique provides a method of processing data comprising the steps of:

performing processing operations;

detecting and correcting correctable malfunctions in said processing operations using malfunction correction circuitry;

detecting when one or more state variables of said malfunction correction circuitry indicate that said malfunction correction circuitry is unable to handle a correctable malfunction arising in said processing operations; and triggering handling of said correctable malfunction as an uncorrectable malfunction when said malfunction correction circuitry is detected as unable to correct said correctable malfunction.

The above, and other objects, features and advantages of this disclosure will be apparent from the following detailed description of illustrative embodiments which is to be read in connection with the accompanying drawings.

DESCRIPTION OF EXAMPLE EMBODIMENTS

Figure 1:
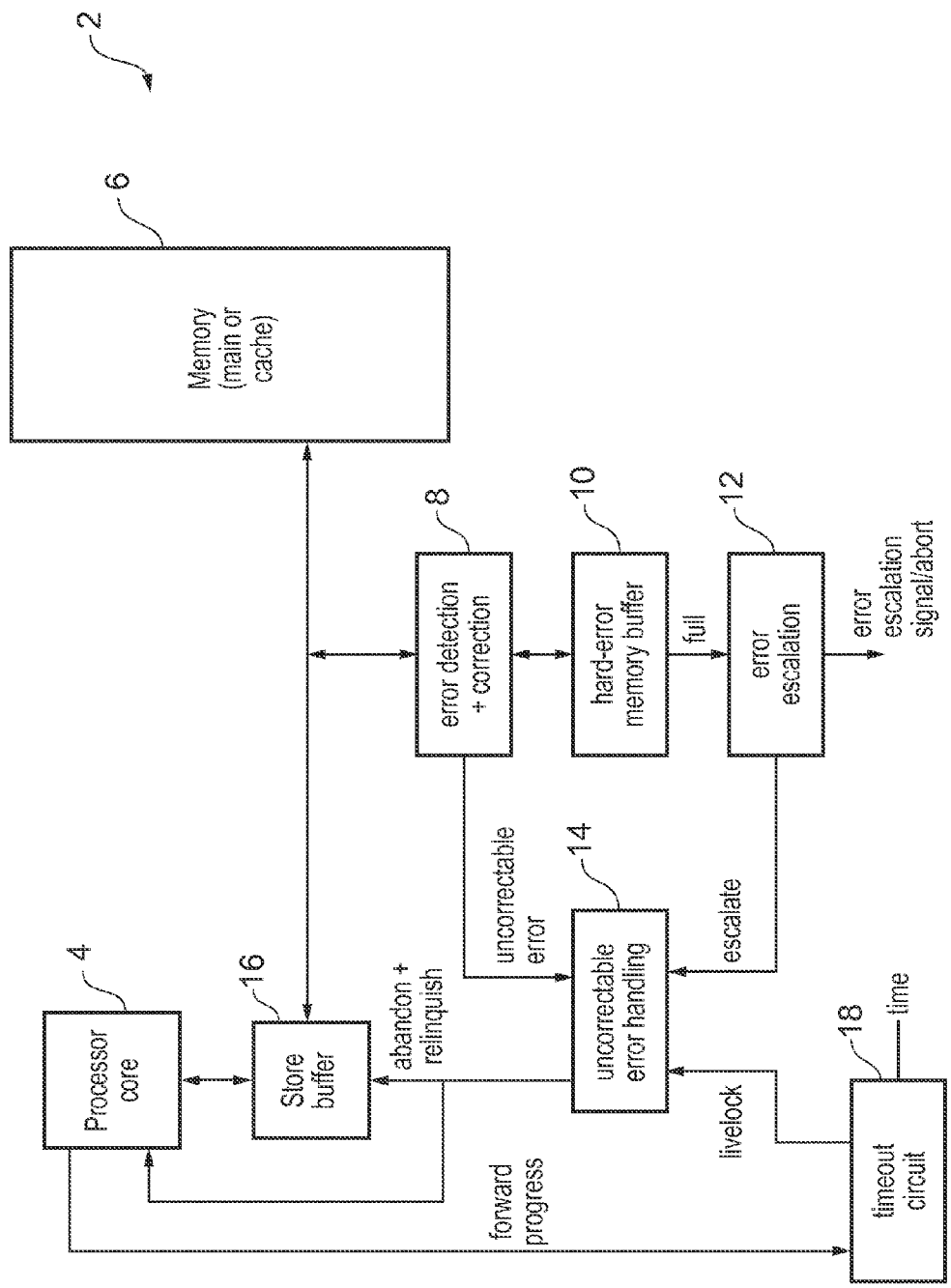
FIG. 1 schematically illustrates a data processing system including circuitry for handling correctable malfunctions and uncorrectable malfunctions.

FIG. 1 schematically illustrates an apparatus 2 for processing data by performing processing operations including memory access operations. More particularly, the apparatus 2 includes a processor core 4 executing program instructions, which may include load instructions and store instructions addressing memory addresses within a memory 6. The memory 6 may be a multiple level memory comprising a cache memory and a main memory. The memory 6 stores data values and associated error correcting codes (ECC). Error detection and correction circuitry 8 serves to compare blocks of data values with associated error correction codes (both read from the memory 6) to determine whether or not those blocks of data values contains errors and if those errors are correctable errors. As will be familiar to those in this field, detected errors may be both correctable and uncorrectable. For example, a single bit error in a block of data values may be correctable, whereas a double bit error in a block of data values may be detected with the error correction codes, but be uncorrectable using those error correction codes. Larger error codes typically give the ability to correct more bit errors. That the error code information allows a correct bit value(s) to be determined when an error is detected renders the error correctable. In contrast, a circuit element failure may be uncorrectable, even if the correct bit value(s) can be determined, i.e. the repaired data will still be stored incorrectly.

The error detection and correction circuitry 8 may attempt to correct a correctable error (malfunction) using the error correction codes. Timing constraints may mean that the memory access which resulted in the error will be replayed. When the data values are accessed a second time, if the error which was corrected is still present, then this indicates a potential hard-error within the memory 6. Such a hard-error may be dealt with using a hard-error memory buffer 10. Such a hard-error memory buffer 10 may operate in a variety of different ways, depending upon the nature of the hard-error detected. If the hard-error detected is in the main memory, then the hard-error memory buffer 10 may serve to provide replacement storage for the area of the main memory in which the hard-error has occurred. If the hard-error has occurred within a cache memory, then the hard-error memory buffer 10 may serve to disable portions of the cache memory 10 such that storage within the portions of the cache memory containing the hard-error is no longer attempted. The hard-error memory buffer 10 has a finite capacity for tracking and managing such errors. When the hard-error memory buffer is full, it is no longer able to service (handle) what would otherwise be correctable malfunctions (errors). In this case, the hard-error memory buffer 10 generates a full signal which is passed to error escalation circuitry 12 and which serves to escalate what would otherwise be a correctable malfunction (error) into an uncorrectable malfunction (error). Thus, the error detection and correction circuitry 8 passes the correctable error to uncorrectable error handling circuitry 14. This uncorrectable error handling circuitry may also be used to handle errors which are initially detected as uncorrectable, e.g. double-bit errors as discussed above, which are not possible to correct with some ECC codes.

The uncorrectable error handling circuitry 14 in response to an uncorrectable error notified to it (either directly or via escalation) serves to handle that uncorrectable error by abandoning the associated processing operations within the processor core 4 and forcing any storage locations within a store buffer 16 associated with abandoned store operations to be relinquished. Thus, the processing operations and the consumed resources associated with those processing operations which give rise to uncorrectable errors are removed from the system.

Also included within the apparatus 2 is timeout circuitry 18, which serves to monitor forward progress through the processing operations by the processor core 4 as well as a time signal so as to identify situations in which a given amount of forward progress has not been made in a certain amount of time. Such situations may correspond to a livelock within the apparatus 2 and may be handled using the uncorrectable error handling circuitry 14, e.g. abandoning further pending processing operations and releasing their associated resources. In this way, the timeout circuitry 18 serves as a fall-back mechanism to ensure forward progress if the correctable error handling and the uncorrectable error handling mechanisms do not themselves ensure forward progress.

Figure 2:
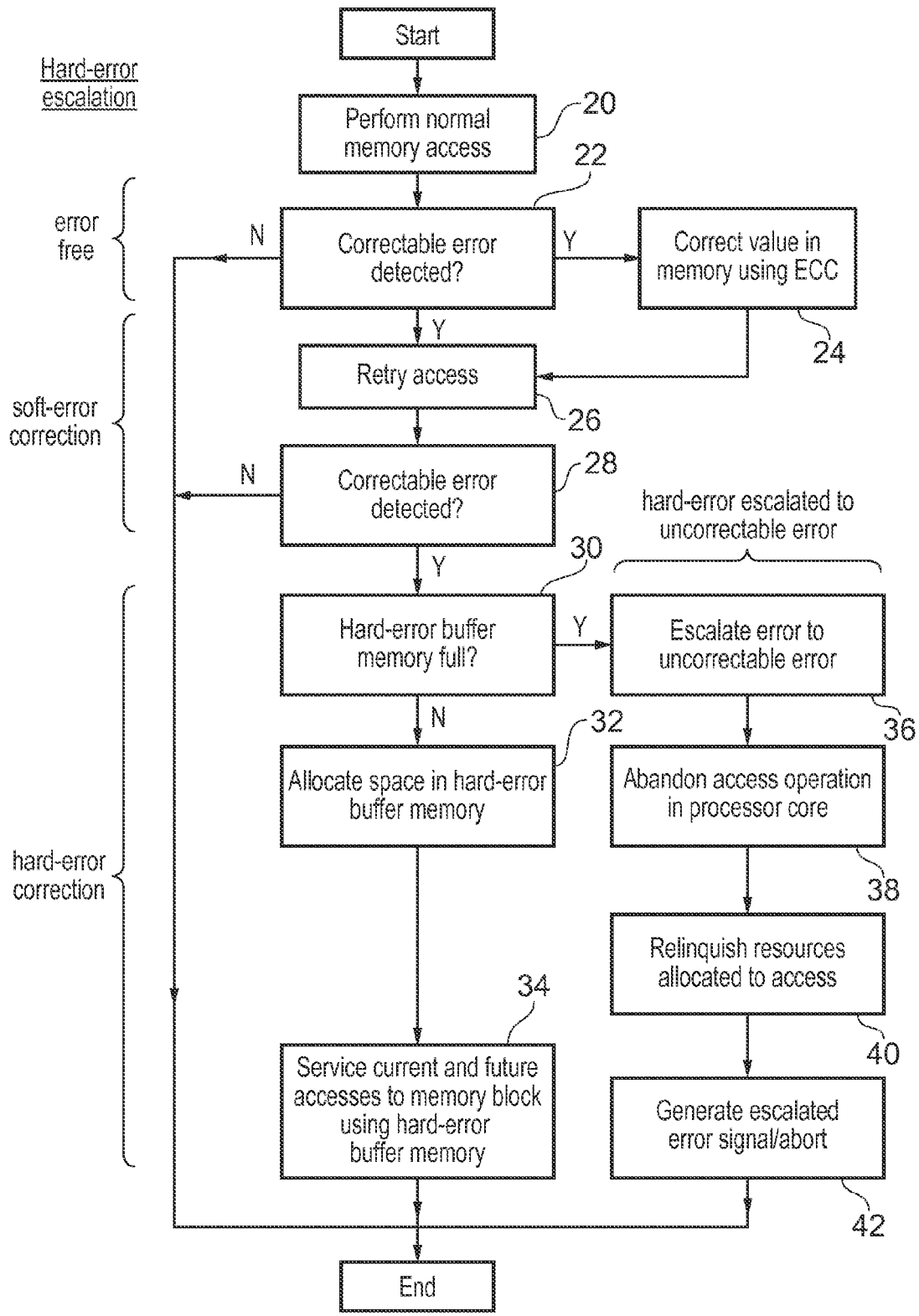
FIG. 2 is a flow diagram schematically illustrating hard-error escalation.

FIG. 2 is a flow diagram schematically illustrating hard-error escalation. At step 20 a normal memory access operation is performed. Step 22 determines whether or not a correctable error has been detected. If no correctable error has been detected, then the processing terminates. If a correctable error has been detected, then at step 24 serves to attempt to correct that error using the error correction codes and then step 26 retries the access. Step 28 then checks again as to whether a correctable error has been detected. If no correctable error is detected at step 28, then this corresponds to a successful soft-error correction. If a correctable error is detected for a second time at step 28, then this indicates that the error concerned is a potential hard-error. Step 30 determines whether the hard-error memory buffer is currently full. If the hard-error memory buffer is not full, then processing proceeds to step 32 where space is allocated within the hard-error memory buffer to correct the hard-error that has been detected. Step 34 then serves to service the current and future accesses associated with the memory block in which the hard-error has been detected using the hard-error memory buffer. It will be appreciated that, as discussed above, the handling of the hard-error by the hard-error memory buffer could take a variety of different forms depending upon the nature of the memory which the hard-error has been detected, and the strategy being employed for dealing with such hard-errors. For example, the hard-error memory buffer could provide alternative storage or may be used to prevent the use of certain cache regions, or some other strategy as will be familiar to those in this technical field. Steps 30, 32 and 34 of FIG. 2 correspond to hard-error correction when this is a correctable malfunction.

If the determination at step 30 is that the hard-error memory buffer is full, then in this circumstance the hard-error is escalated to correspond to an uncorrectable error at step 36. Step 38 then triggers the processor core 4 to abandon the access operations that are associated with the detected hard-error. Step 40 controls the store buffer 16 (and any other resources allocated) to relinquish the storage locations associated with the access in which a hard-error has been detected. Step 42 then generates an escalated error signal/abort from the escalation circuitry 12 as illustrated in FIG. 1. Steps 36, 38, 40 and 42 of FIG. 2 correspond to a correctable hard-error being escalated to an uncorrectable error due to a lack of storage within the hard-error memory buffer, i.e. the error correction circuitry being in a state where it is not able to correct what would otherwise be a correctable error. Thus, the error correction circuitry, which includes the hard-error memory buffer 10, due to a lack of storage capacity within the hard-error memory buffer 10 serves to trigger a correctable malfunction to be handled as an uncorrectable malfunction.

Other embodiments may handle the escalation of errors differently to the example illustrated in FIG. 2. For example, in some embodiments, when an error is detected then the access is replayed and the system attempts to allocate space in the hard error memory buffer 10 at the same time. This has the advantage of avoiding a need to track how many times a particular access has been attempted. Other variations are also possible.

The present technique recognises and solves a problem arising within data processing systems which have malfunction correction circuitry in that the malfunction correction circuitry may become overloaded to a degree that it is no longer able to properly correct for detected correctable malfunctions and a potential livelock situation can arise as the finite resources of the malfunction correcting circuitry are reused by different correctable malfunctions that are detected. The present technique addresses this issue by detecting from the malfunction correction circuitry that it is in a state in which it is unable to correct a correctable malfunction (i.e. one that the malfunction correction circuitry could correct under normal circumstances) which arises in the processing operations and in this case escalating the correctable malfunction to be handled as an uncorrectable malfunction. This technique recognises that while a correctable malfunction has been treated as an uncorrectable malfunction, and accordingly some loss of data integrity has likely arisen, this situation is preferable to trying to use the malfunction correction circuitry to correct the correctable malfunction when this is not possible, e.g. the malfunction correction circuitry is already fully loaded. This technique enables a more efficient response to be achieved to the overwhelming of the malfunction correction circuitry than might otherwise be achieved, e.g. through the use of watchdog timers seeking to identify a livelock that has arisen.

While it will be appreciated that the processing operations and the malfunctions detected could take a wide variety of different forms, such as timing errors in logic circuitry, the present technique is well suited to use within systems where the processing operations are ECC memory access operations, which serve to access one or more data values and an error correcting code from a memory address in a memory. In this context, the malfunction correcting circuitry may be configured to use the error correcting code to correct a correctable malfunction in the one or more data values.

In some example embodiments, the malfunction correction circuitry may include a hard-error memory buffer which serves to correct for correctable malfunctions associated with one or more memory address locations within the memory for which hard errors have occurred as previously described. Such hard errors typically arise through component failure rather than being temporary errors which can be corrected by the error correction code and then the original hardware continue to be used.

While the provision of a hard-error memory buffer is desirable in order to permit hard errors to be efficiently addressed, it suffers from the issue that the hard-error memory buffer has a finite capacity and accordingly, if too many hard errors occur, then the hard-error memory buffer will become full. The one or more state variables indicating that the malfunction correction circuitry is unable to correct a correctable error may in such circumstances comprise as a signal indicating that the hard-error memory buffer is full.

When a correctable malfunction is escalated to an uncorrectable malfunction, this may be handled by an uncorrectable malfunction handling circuitry. In some embodiments this may operate by abandoning the one or more erroneous processing operations which are associated with the uncorrectable malfunction. In some embodiments, such abandoned processing operations may be flushed from the processing pipeline of a processor core.

Another aspect of the operation of the uncorrectable malfunction handling circuitry is that it may serve to force the relinquishing of processing resources within the processing circuitry which are handling the one or more erroneous processing operations. It may be important that such processing resources are relinquished as otherwise they may serve to at least temporarily reduce the effectiveness of the system as these processing resources will not be available for other processing operations.

In some embodiments the uncorrectable malfunction may be associated with an erroneous store operation. In this circumstance, the processing resources may include a store buffer configured to buffer store operations and the uncorrectable malfunction handling circuitry may serve to force storage within the stored buffer associated with the erroneous store operations to be relinquished when those erroneous store operations are escalated to have an uncorrectable status.

The malfunction escalation circuitry may also in some embodiments serve to generate an escalation indicating signal which serves to indicate that a correctable malfunction has been escalated to an uncorrectable malfunction. This indication may be useful for other parts of the system in determining an appropriate response or an appropriate reconfiguration. The escalation indicating signal can have a variety of different forms, including a signal on a hardware pin and a type of abort signal particularly associated with an uncorrectable malfunction.

While the above has discussed the one or more state variables corresponding to the malfunction correcting circuitry being unable to correct a correctable malfunction in the context of the overflow of a hard-error memory buffer, the one or more state variables may also correspond to other states such as, for example, any malfunction correction circuitry having a state vulnerable to livelock whereby repeated correction of correctable malfunctions will prevent forward progress in processing operations.

In some embodiments in addition to, and separate from, the detection circuitry and the escalation circuitry, there may be also be provided timeout circuitry configured to trigger abandoning of at least some pending processing operations if forward progress through those processing operations of at least a threshold amount in a given time is not detected. Such timeout circuitry may provide a fall-back mechanism for preventing livelock when this has occurred.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

We claim:

1. Apparatus for processing data comprising:
   processing circuitry configured to perform processing operations;
   malfunction correction circuitry configured to detect and to correct correctable malfunctions in said processing operations;
   detection circuitry coupled to said malfunction correction circuitry and configured to detect when one or more state variables of said malfunction correction circuitry indicate that said malfunction correction circuitry is unable to handle a correctable malfunction arising in said processing operations; and
   malfunction escalation circuitry coupled to said detection circuitry and configured to trigger handling of said correctable malfunction as an uncorrectable malfunction when said malfunction correction circuitry is detected as unable to correct said correctable malfunction,
   wherein said one or more state variables correspond to said malfunction correction circuitry having a state vulnerable to livelock whereby repeated correction of correctable malfunctions will prevent forward progress in processing operations.

2. Apparatus as claimed in claim 1, wherein said processing operations are memory access operations to access one or more data values and an error correcting code value from a memory address in a memory.

3. Apparatus as claimed in claim 2, wherein said malfunction correction circuitry is configured to use said error correcting code to correct a correctable malfunction in said one or more data value from said memory address.

4. Apparatus as claimed in claim 3, wherein said malfunction correction circuitry comprises a hard-error memory buffer configured to correct for correctable malfunctions associated with one or more address locations within said memory having hard errors.

5. Apparatus as claimed in claim 4, wherein said one or more state variable indicate that said hard-error memory buffer is full.

6. Apparatus as claimed in claim 1, comprising uncorrectable malfunction handling circuitry coupled to said escalation circuitry and configured to handle said uncorrectable malfunction by abandoning one or more erroneous processing operations associated with said uncorrectable malfunction.

7. Apparatus as claimed in claim 6, wherein said processing circuitry comprises processing resources for handling said processing operations and said uncorrectable malfunction handling circuitry is configured to relinquish processing resources within said processing circuitry handling said one or more erroneous processing operations.

8. Apparatus as claimed in claim 7, wherein said uncorrectable malfunction is associated with an erroneous store operation, said processing resources comprise a store buffer configured to buffer store operations and said uncorrectable malfunction handling circuitry is configured to relinquish storage within said store buffer associated with said erroneous store operation.

9. Apparatus as claimed in claim 1, wherein said malfunction escalation circuitry is configured to generate an escalation indicating signal indicating that said correctable malfunction has been escalated to said uncorrectable malfunction.

10. Apparatus as claimed in claim 9, wherein said escalation indicating signal is one of a signal on a hardware status pin and a type of abort signal.

11. Apparatus as claimed in claim 1, wherein said uncorrectable malfunction escalated from said correctable malfunction is handled using a mechanism shared with malfunctions initially detected as uncorrectable malfunctions.

12. Apparatus as claimed in claim 1, comprising timeout circuitry configured to trigger abandoning of at least some pending processing operations if forward progress through said processing operations of at least a threshold amount in a given time is not detected.

13. A method of processing data comprising the steps of:
performing processing operations;
detecting and correcting correctable malfunctions in said processing operations using malfunction correction circuitry;
detecting when one or more state variables of said malfunction correction circuitry indicate that said malfunction correction circuitry is unable to handle a correctable malfunction arising in said processing operations; and
triggering handling of said correctable malfunction as an uncorrectable malfunction when said malfunction correction circuitry is detected as unable to correct said correctable malfunction,
wherein said one or more state variables correspond to said malfunction correction circuitry having a state vulnerable to livelock whereby repeated correction of correctable malfunctions will prevent forward progress in performing processing operations.

14. Apparatus for processing data comprising:
processing circuitry configured to perform processing operations;
malfunction correction circuitry configured to detect and to correct correctable malfunctions in said processing operations;
detection circuitry coupled to said malfunction correction circuitry and configured to detect when one or more state variables of said malfunction correction circuitry indicate that said malfunction correction circuitry is unable to handle a correctable malfunction arising in said processing operations; and
malfunction escalation circuitry coupled to said detection circuitry and configured to trigger handling of said correctable malfunction as an uncorrectable malfunction when said malfunction correction circuitry is detected as unable to correct said correctable malfunction,
wherein said processing operations are memory access operations to access one or more data values and an error correcting code value from a memory address in a memory,
wherein said malfunction correction circuitry is configured to use said error correcting code to correct a correctable malfunction in said one or more data value from said memory address,
wherein said malfunction correction circuitry comprises a hard-error memory buffer configured to correct for correctable malfunctions associated with one or more address locations within said memory having hard errors, and
wherein said one or more state variable indicate that said hard-error memory buffer is full.

* * * * *